United States Patent [19]
Hansen

[11] Patent Number: 6,100,662
[45] Date of Patent: Aug. 8, 2000

[54] STEP MOTOR STABILIZATION CONTROL

[75] Inventor: Alan M. Hansen, Higganum, Conn.

[73] Assignee: Warner Electric Technology, Inc., Richmond, Va.

[21] Appl. No.: 09/345,879

[22] Filed: Jun. 30, 1999

Related U.S. Application Data

[60] Provisional application No. 60/129,386, Apr. 13, 1999.

[51] Int. Cl.[7] .................................................. H02P 8/12
[52] U.S. Cl. .......................... 318/685; 318/611; 318/293; 318/484
[58] Field of Search .................................... 318/599, 565, 318/611, 623, 685, 696, 293, 448, 452, 460, 484

[56] References Cited

U.S. PATENT DOCUMENTS

| | | | |
|---|---|---|---|
| 3,593,097 | 7/1971 | Gebelein, Jr. | 318/696 |
| 3,863,118 | 1/1975 | Lander et al. | 318/685 |
| 3,911,339 | 10/1975 | Rettig | 318/171 |
| 4,081,736 | 3/1978 | Leenhouts et al. | 318/696 |
| 4,119,895 | 10/1978 | Muller | 318/254 |
| 4,119,901 | 10/1978 | Leenhouts | 318/685 |
| 4,250,435 | 2/1981 | Alley et al. | 318/138 |
| 4,455,520 | 6/1984 | Ward et al. | 318/696 |
| 4,484,126 | 11/1984 | Fulton et al. | 318/800 |
| 4,514,666 | 4/1985 | Suzuki | 318/293 |
| 4,673,855 | 6/1987 | Boillat | 318/696 |
| 4,675,590 | 6/1987 | Pellegrino et al. | 318/696 |
| 4,683,409 | 7/1987 | Boillat | 318/696 |
| 5,015,903 | 5/1991 | Hancock et al. | 310/168 |
| 5,122,715 | 6/1992 | Kimura et al. | 318/138 |
| 5,153,492 | 10/1992 | Landseadel | 318/599 |
| 5,162,798 | 11/1992 | Yundt | 341/116 |
| 5,216,345 | 6/1993 | Eyerly | 318/685 |
| 5,420,492 | 5/1995 | Sood et al. | 318/809 |
| 5,717,297 | 2/1998 | Karwath et al. | 318/254 |

OTHER PUBLICATIONS

Pacific Scientific, "6000 Series Microstepping Drives", pp. C6–C10. Model 6410. "Microstepping Drive Module". (No publication date).

Industrial Devices Corporation, "Take the Next Step in Microstepping Technology with the Next Step Microstepping Drive", pp. 36–42. (No publication date).

Industrial Devices Corporation, "Next Step Microstepping Drive Quick Setup & Reference" (3 pages). 64 Digital Drive, Novato, CA 94949. published Sep. 2, 1997.

Primary Examiner—Bentsu Ro
Attorney, Agent, or Firm—Dykema Gossett PLLC

[57] ABSTRACT

A method and circuit for controlling a motor and reducing and/or eliminating mid-velocity instability in the motor are provided. The method includes the step of receiving a decay time indicative signal that is indicative of the current decay time in a phase coil of the motor after current commutation. The decay time indicative signal assumes a first polarity proportional to the current decay time in the phase coil. The method further includes the step of calculating a delay time corresponding to the amount of time the decay time indicative signal has the first polarity. Finally, the method includes the step of controlling the direction of current in the phase coil or another phase coil of the motor responsive to the delay time and a current direction signal generated by a translator. The inventive method and circuit enable reduction and/or elimination of mid-velocity instability even when the motor is operated in a microstepping mode.

20 Claims, 5 Drawing Sheets

STEP MOTOR STABILIZATION CONTROL

CLAIM OF PRIORITY

This application claims the benefit of U.S. Provisional Application Ser. No. 60/129,386, filed Apr. 13, 1999.

BACKGROUND OF THE INVENTION

1. Field of the Invention

The present invention relates to a method and a circuit for controlling a motor. In particular, the present invention relates to a method and circuit for controlling current in a motor to reduce and/or eliminate oscillation of the motor's rotor about a desired rotor position commanded by the motor's stator.

2. Disclosure of Related Art

In a conventional motor control circuit an input signal is provided to a translator that generates one or more current level and current direction signals in response to the input signal. The current level and current direction signals are designed to control the current level and direction of current flow in the phase coils of the motor, thereby controlling the rotational position of the motor's rotor. The current level and current direction signals may be provided to a current control module that generates a plurality of PWM (pulse width modulated) motor control signals responsive to the current level and current direction signals. The motor control signals may then be provided to a plurality of switches used to control the level and direction of current flow within each phase coil of the motor.

During the mid-velocity operating range of the above-described motor, the actual position of the motor's rotor begins to oscillate between leading and lagging the commanded rotor position. One known method and circuit for reducing and/or eliminating such oscillation is disclosed in U.S. Pat. No. 4,081,736, the entire disclosure of which is incorporated herein by reference. In this known method and circuit, the degree to which the actual rotor position differs from the commanded rotor position is measured. The time at which the input signal is provided to the translator is then adjusted to control the timing of the subsequent current level and current direction signals generated by the translator.

The above-described circuit and method for reducing and/or eliminating mid-velocity instability works well for motors operating in a full or even half-stepping mode. However, the disclosed method and circuit does not function well for motors operating in a microstepping mode. In the microstepping mode, adjusting the time at which the input pulse is provided to the translator does not enable individual adjustment and instability control during each microstep.

There is thus a need for a method and a circuit for controlling a motor that will minimize and/or eliminate one or more of the above-mentioned deficiencies.

SUMMARY OF THE INVENTION

The present invention provides a method and a circuit for controlling a motor.

An object of the present invention is to provide a method and circuit for controlling a motor that will allow correction of mid-velocity instability in the motor while the motor is operating in a microstepping mode.

A method for controlling a motor in accordance with the present invention includes the step of receiving a first decay time indicative signal that is indicative of the current decay time in a first phase coil of the motor. The inventive method and circuit rely on the principle that the time required for a current to decay in the phase coils of a motor after commutation is proportional to the inductance of the phase coil, which is in turn indicative of the position of the motor's rotor. The first decay time indicative signal represents the decay time in the first phase coil of the motor through the polarity of the signal, wherein the signal has a first polarity for a period of time proportional to the period of current decay in the first phase coil. The method further includes the step of calculating a first delay time corresponding to an amount of time the first decay time indicative signal has the first polarity. A method in accordance with the present invention may finally include the step of controlling a direction of the current in the first phase coil responsive to a first current direction signal and the first delay time. The first current direction signal may be generated by a translator responsive to an input signal. The first delay time may be used to control the time at which the first current direction signal is provided to a current control module that is used to control current within the first phase coil of the motor.

A circuit for controlling a motor in accordance with the present invention includes a sensor configured to sense the polarity of a first decay time indicative signal wherein the decay time indicative signal is indicative of the current decay time in a first phase coil of the motor. The inventive control circuit further includes a delay time measurement circuit configured to calculate a first delay time corresponding to an amount of time in which the first decay time indicative signal has a first polarity. The delay time measurement circuit may include a capacitor that charges while the first decay time indicative signal has the first polarity. The inventive control circuit may further include a directional control circuit configured to control the direction of current in the first phase coil responsive to a first current direction signal and the first delay time. The directional control circuit may include a multivibrator that generates a pulse having a period corresponding to the first delay time and a flip flop that generates a directional control signal responsive to the current direction signal and the generated pulse. The directional control signal may then be provided to a current control module used to control current flow within the first phase coil of the motor.

A method and circuit in accordance with the present invention represent a significant improvement over known methods and circuits for controlling a motor. In particular, the inventive method and circuit reduce and/or eliminate oscillation of the motor's rotor about a commanded rotor position during the mid-velocity operating range of the motor—even when the motor is operating in a microstepping mode. The inventive method and circuit accomplish this objective by controlling the timing of the control signals generated by a translator in response to an input signal as opposed to controlling the timing of the input signal itself.

These and other features and objects of this invention will become apparent to one skilled in the art from the following detailed description and the accompanying drawings illustrating features of this invention by way of example.

DETAILED DESCRIPTION OF THE PREFERRED EMBODIMENTS

Figure 1:
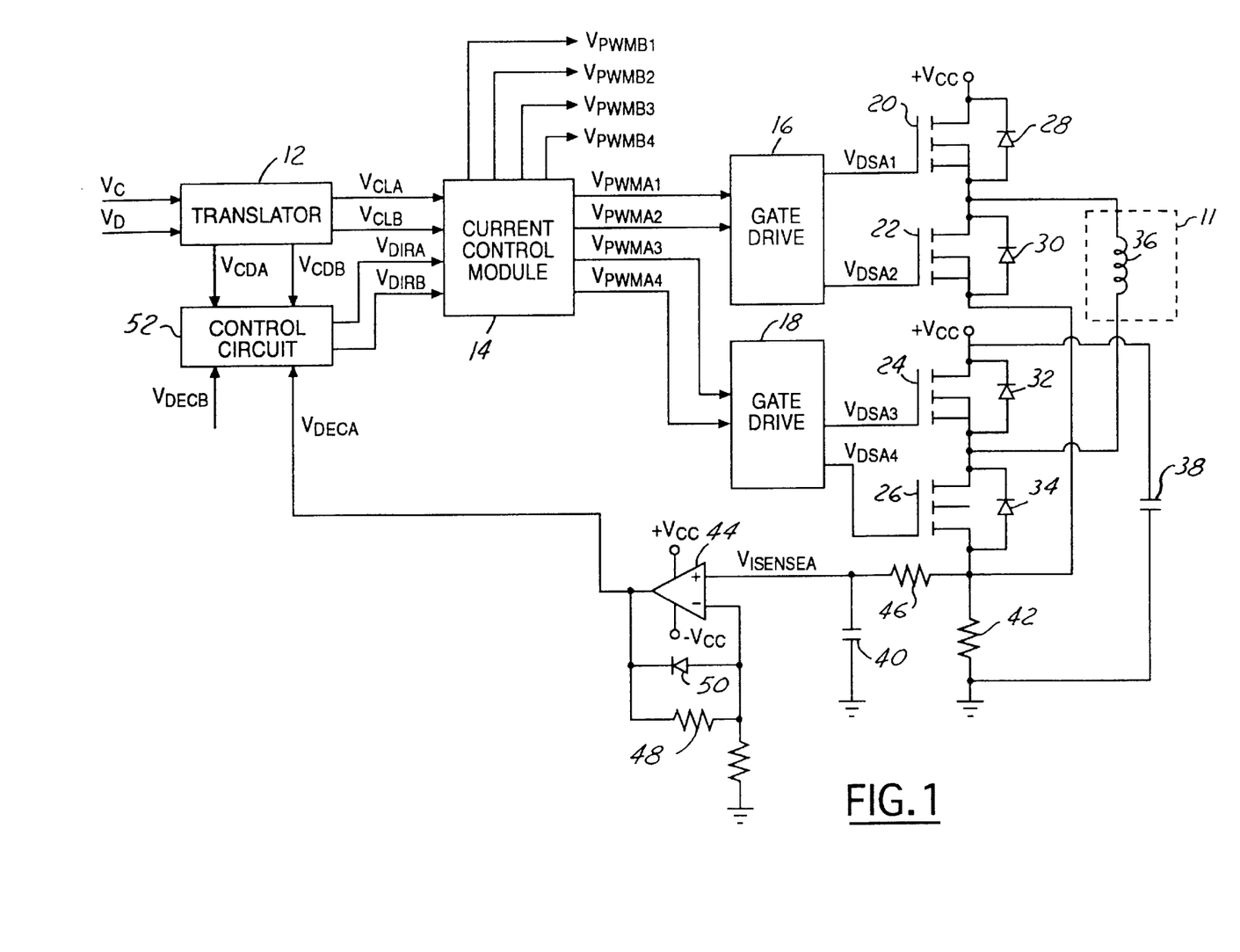
FIG. 1 is a schematic and block diagram illustrating a control circuit for a motor incorporating a control circuit in accordance with the present invention.

Referring now to the drawings wherein like reference numerals are used to identify identical components in the various views, FIG. 1 illustrates a circuit 10 for controlling a motor 11 (shown diagrammatically in broken line), such as a conventional step motor. Circuit 10 may include a translator 12, a current control module 14, gate drives 16, 18, switches 20, 22, 24, 26, diodes 28, 30, 32, 34, a phase coil 36, capacitors 38, 40, a resistor 42, an amplifier 44, resistors 46, 48, and a diode 50. In accordance with the present invention, circuit 10 may also include a control circuit 52 for reducing and/or eliminating mid-velocity instability in motor 11. Although circuits 10, 52 will be described with reference to a two-phase motor, it should be understood that circuits 10, 52 could be used with motors having more than two phases. Further, although circuit 10 illustrates only one phase coil 36 (i.e., phase A) of motor 11, it should be understood that portions of circuit 10, such as translator 12, module 14, and circuit 52 may be used in controlling the current in other phase coils of motor 11.

Translator 12 is provided to control the level of current within phase coil 36 as well as the direction of current flow within phase coil 36. Translator 12 is conventional in the art and may include one or more indexable memories (such as EPROMs—not shown) that store values corresponding to a known control function (e.g. sine or cosine wave). Translator 12 may receive an input command signal $V_C$ and a direction command signal $V_D$ and generate current level signals $V_{CLA}$, $V_{CLB}$, and current direction signals $V_{CDA}$, $V_{CDB}$ to control the level and direction of current within the phase coils of motor 11.

Current control module 14 is provided to control switches 20, 22, 24, 26 of circuit 10. Module 14 is conventional in the art and may comprise either discrete circuits or a programmable microcontroller. Module 14 receives current level signals $V_{CLA}$, $V_{CLB}$, from translator 12 and directional control signals $V_{DIRA}$, $V_{DIRB}$ from control circuit 52 (described in greater detail hereinbelow) and generates PWM control signals responsive thereto. The PWM control signals are used to control switches that adjust the level and direction of current within each phase coil of motor 11. In the illustrated embodiment, control signals $V_{PWMA1}$, $V_{PWMA2}$, $V_{PWMA3}$, $V_{PWMA4}$ may be used to control switches 20, 22, 24, 26 which adjust the level and direction of current within phase coil 36. It should be understood, however, that module 14 may generate additional PWM control signals, such as $V_{PWMB1}$, $V_{PWMB2}$, $V_{PWMB3}$, $V_{PWMB4}$ to control switches associated with other phase coils of motor 11.

Gate drives 16, 18 are provided to adjust the voltage level of PWM signals $V_{PWMA1}$, $V_{PWMA2}$, $V_{PWMA3}$, $V_{PWMA4}$ in a conventional manner to account for different tolerances and requirements among the components of circuit 10. In particular, gate drives 16, 18 generate drive signals $V_{DSA1}$, $V_{DSA2}$, $V_{DSA3}$, $V_{DSA4}$ in response to PWM signals $V_{PWMA1}$, $V_{PWMA2}$, $V_{PWMA3}$, $V_{PWMA4}$, respectively. Drive signals $V_{DSA1}$, $V_{DSA2}$, $V_{DSA3}$, $V_{DSA4}$ control the actuation of switches 20, 22, 24, 26 and thereby control the level and direction of current in coil 36.

Switches 20, 22, 24, 26 are provided to selectively couple phase coil 36 to a voltage supply to energize and deenergize coil 36. Switches 20, 22, 24, 26 are conventional in the art and may take any of a plurality of forms well known in the art. For example, switches 20, 22, 24, 26 may comprise MOSFETs. Switches 20, 22, 24, 26 are opened and closed responsive to control signals $V_{DSA1}$, $V_{DSA2}$, $V_{DSA3}$, $V_{DSA4}$, respectively. Whenever switches 20, 26 are closed, current flows through coil 36 in a first direction. Alternately, whenever switches 22, 24 are closed, current flows in a second direction through coil 36.

Diodes 28, 30, 32, 34 are provided to control the dissipation of current from coil 36 and, in particular, to return current dissipated from coil 36 to the voltage supply. Diodes 28, 30, 32, 34 are conventional in the art and may be connected in parallel with switches 20, 22, 24, 26, respectively.

Phase coil 36 is provided to create a magnetic field within motor 11 that causes rotation of the motor's rotor. In particular, coil 36 may be disposed about a pair of diametrically opposed stator poles of the motor's stator in a conventional manner to cause a magnetic attraction—upon energization of coil 36—between the stator poles and the motor's rotor and thereby cause the rotor to rotate. Coil 36 is conventional in the art.

Capacitor 38 is provided to store energy dissipated by phase coil 36 upon commutation of the motor phase. Capacitor 38 is conventional in the art and may be connected in parallel with the series combination of switches 24, 26 and resistor 42.

Resistor 42 is provided to generate a current indicative signal $V_{ISENSEA}$ indicative of the level of current in coil 36 and is conventional in the art. Resistor 42 may have one terminal connected to switches 22, 26 and a second terminal connected to ground. It will be understood by those in the art that a variety of conventional current sensors could be employed other than resistor 42, including, for example, Hall effect current sensors.

Amplifier 44 is provided to generate a decay time indicative signal $V_{DECA}$ indicative of the time required for current in phase coil 36 to decay after commutation (i.e., after a change in the direction of current flow). Amplifier 44 is conventional in the art. The polarity of decay time indicative signal $V_{DECA}$ varies depending upon the direction of current in resistor 44. While current is flowing through coil 36 and resistor 44 to ground, decay time indicative signal $V_{DECA}$ has a positive polarity. When the current in coil 36 is commutated (i.e., a reversal in commanded current direction occurs), current flows through resistor 44 in an opposite direction for a decay time interval. Thus, decay time indicative signal $V_{DECA}$ has a negative polarity during this decay time interval and is indicative of the current decay time within phase coil 36. It should be understood by those in the art that amplifier 44 could be constructed so as to reverse these polarities. Amplifier 44 may have a non-inverting terminal connected to resistor 46 and capacitor 40.

Resistor 46 and capacitor 40 are provided to filter noise from current indicative signal $V_{ISENSEA}$ prior to its input into amplifier 44. Resistor 46 and capacitor 40 are conventional in the art.

Resistor 48 and diode 50 provide a feedback path for amplifier 44 for non-inverting operation. Resistor 48 and diode 50 are also conventional in the art.

Control circuit 52 is provided to reduce and/or eliminate mid-velocity instability in motor 11 in accordance with the present invention. Circuit 52 receives current direction signal $V_{CDA}$ from translator 12 and decay time indicative signal $V_{DECA}$ from amplifier 44 and may generate directional control signal $V_{DIRA}$ responsive thereto. Similarly, circuit 52 may also receive current direction signal $V_{CDB}$ from translator 12 and a decay time indicative signal $V_{DECB}$ from an amplifier associated with another motor phase of motor 11 and may generate directional control signal $V_{DIRB}$ responsive thereto. As described in greater detail hereinbelow, directional control signal $V_{DIRA}$ may alternatively be generated in response to current direction signal $V_{CDA}$ and decay time indicative signal $V_{DECB}$. Similarly, directional control signal $V_{DIRB}$ may alternatively be generated in response to current direction signal $V_{CDB}$ and decay time indicative signal $V_{DECA}$.

Figure 2:
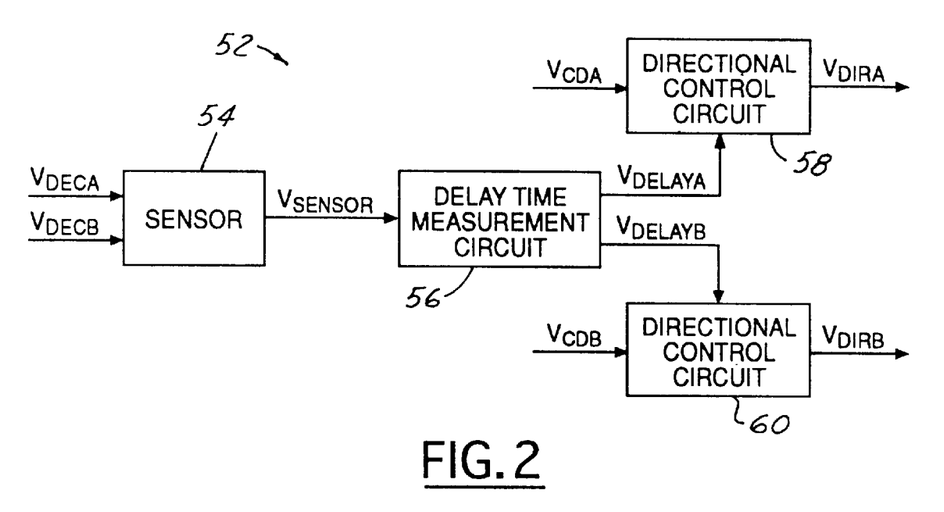
FIG. 2 is a block diagram illustrating a control circuit in accordance with the present invention.
Figure 3:
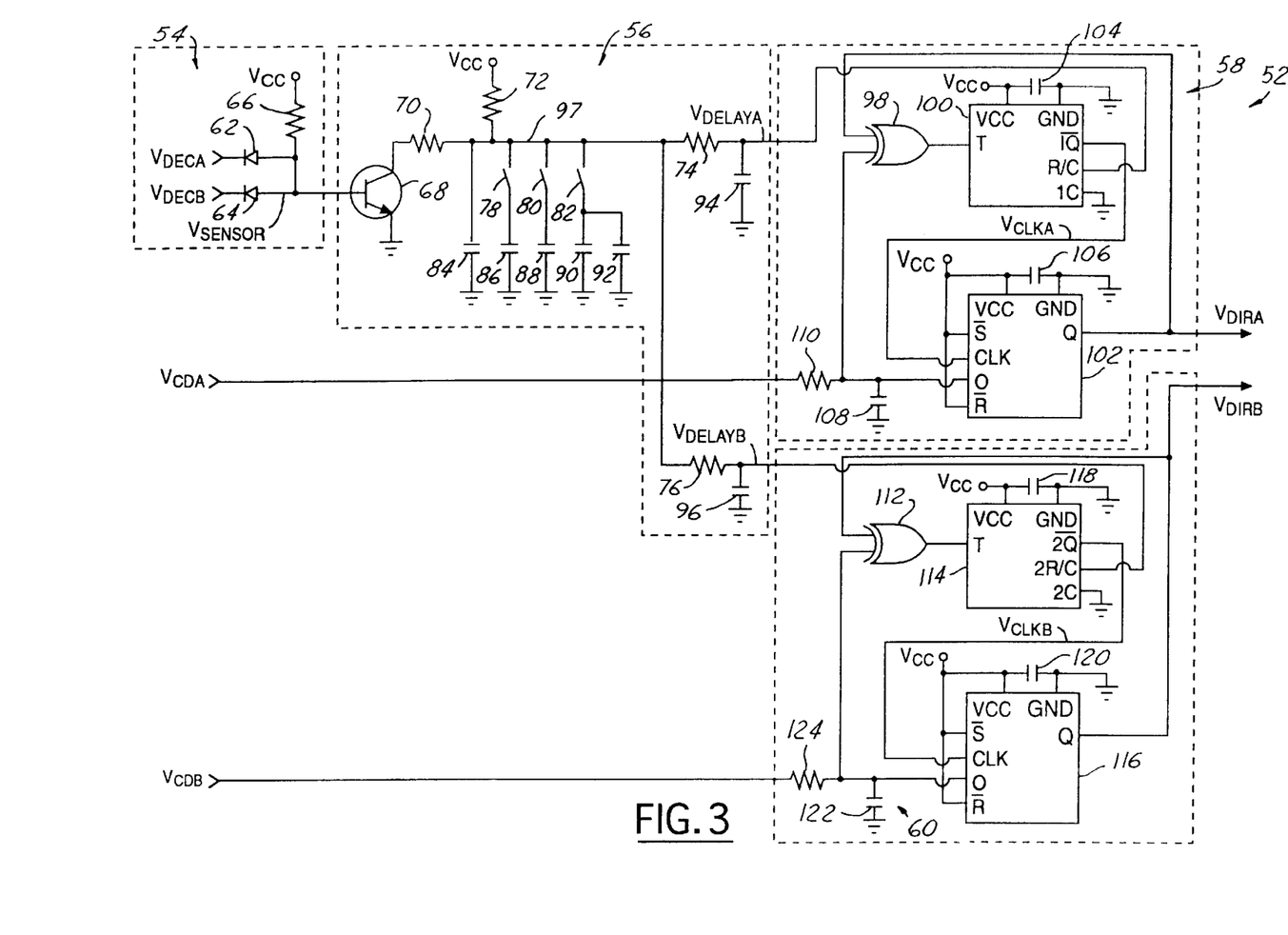
FIG. 3 is a schematic diagram illustrating the control circuit of FIG. 2.

Referring now to FIGS. 2 and 3, circuit 52 will be described in greater detail. Referring to FIG. 2, circuit 52 may include a sensor 54, a delay time measurement circuit 56, and directional control circuits 58, 60.

Sensor 54 is provided to sense the polarity of decay time indicative signals $V_{DECA}$, $V_{DECB}$. Referring to FIG. 3, sensor 54 may comprise diodes 62, 64, and a resistor 66. Diodes 62, 64 are conventional in the art and conduct current when decay time indicative signals $V_{DECA}$, $V_{DECB}$, respectively, have a negative polarity. Whenever one or both of decay time indicative signals $V_{DECA}$, $V_{DECB}$ have a negative polarity, the voltage $V_{SENSOR}$ induced at the anodes of diodes 62, 64 falls to a low voltage level. Alternately, whenever both of decay time indicative signals $V_{DECA}$, $V_{DECB}$ have a positive polarity, the voltage $V_{SENSOR}$ induced at the anodes of diodes 62, 64 rises to a high voltage level. Resistor 66 is also conventional in the art and is provided to limit the level of current flowing through diodes 62, 64.

Referring again to FIG. 2, delay time measurement circuit 56 is provided to calculate delay times $\Delta_A$, $\Delta_B$ corresponding to an amount of time in which the decay time indicative signals $V_{DECA}$, $V_{DECB}$, respectively, have a first polarity. Circuit 56 generates delay signals $V_{DELAYA}$, $V_{DELAYB}$ corresponding to delay times $\Delta_A$, $\Delta_B$. In the illustrated embodiment, delay times $\Delta_A$, $\Delta_B$ correspond to the amount of time decay time indicative signals $V_{DECA}$, $V_{DECB}$, respectively, have a negative polarity. It should be understood, however, that circuit 56 could be configured such that $\Delta_A$, $\Delta_B$ correspond to the amount of time decay time indicative signals $V_{DECA}$, $V_{DECB}$, respectively, have a positive polarity. Referring to FIG. 3, circuit 56 may comprise a switch 68, resistors 70, 72, 74, 76, switches 78, 80, 82, and capacitors 84, 86, 88, 90, 92, 94, 96.

Switch 68 is provided to control the current flow that charges capacitors 84, 86, 88, 90, 92. In the illustrated embodiment, switch 68 opens—and allows current to flow to capacitors 84, 86, 88, 90, 92—whenever the voltage $V_{SENSOR}$ induced at the anodes of diodes 62, 64 of sensor 54 attains a relatively low logic level. As discussed hereinabove, this state occurs whenever either of decay time indicative signals $V_{DECA}$, $V_{DECB}$ has a negative polarity. Switch 68 is conventional in the art and may comprise a BJT transistor.

Resistors 70, 72 are provided to limit the level of current provided to capacitors 84, 86, 88, 90, 92. Resistors 70, 72 are conventional in the art.

Resistors 74, 76 are provided to control the voltage level of capacitors 94, 96, respectively. In particular—as discussed in greater detail hereinbelow—resistors 74, 76 and capacitors 84, 86, 88, 90, 92 control the rise time of the voltage level of capacitors 94, 96. This rise time corresponds to delay times $\Delta_A$, $\Delta_B$.

Switches 78, 80, 82 are provided to control current flow to capacitors 86, 88, 90, 92. Switches 78, 80, and 82 are conventional in the art.

Capacitors 84, 86, 88, 90, 92 are provided to determine delay times $\Delta_A$, $\Delta_B$ and are conventional in the art. Capacitors 84, 86, 88, 90, 92 are connected directly, or indirectly through switches 78, 80, 82, to a common node 97. Capacitor 84 charges whenever switch 68 is open. Similarly, each of capacitors 86, 88, 90, 92 may charge whenever switch 68 is open if their corresponding switches 78, 80, 82 are closed. Because switch 68 opens when either of decay time indicative signals $V_{DECA}$, $V_{DECB}$ has a negative polarity, the voltage at node 97 will correspond to the amount of time signals $V_{DECA}$, $V_{DECB}$ have a negative polarity. It should be understood by those in the art that a single capacitor, such as capacitor 84, may be used to determine delay times $\Delta_A$, $\Delta_B$. However, capacitors 86, 88, 90, 92 may be provided to control the level of voltage induced on capacitor 84 when switch 68 is open. It should be understood that such control may be implemented based upon specific characteristics of motor 11 such as the gauge of wire forming phase coil 36, the length of the rotor and stator lamination stacks in motor 11, and the load on motor 11.

Capacitors 94, 96 act together with resistors 74, 76 to generate delay signals $V_{DELAYA}$, $V_{DELAYB}$, respectively, corresponding to delay times $\Delta_A$, $\Delta_B$ as discussed in greater detail hereinbelow. Capacitors 94, 96 are conventional in the art.

Referring again to FIG. 2, directional control circuit 58 is provided to control the direction of current in phase coil 36 of motor 11 responsive to current direction signal $V_{CDA}$ and delay signal $V_{DELAYA}$. Similarly, directional control circuit 60 may be provided to control the direction of current in another phase coil of motor 11 responsive to current direction signal $V_{CDB}$ and delay signal $V_{DELAYB}$. Referring to FIG. 3, circuit 58 may include an exclusive-or (XOR) gate 98, a multivibrator 100, a flip-flop 102, capacitors 104, 106, 108, and a resistor 110. Similarly, circuit 60 may include an XOR gate 112, a multivibrator 114, a flip-flop 116, capacitors 118, 120, 122, and a resistor 124.

XOR gates 98, 112 are provided to control multivibrators 100, 114, respectively. Gates 98, 112 are conventional in the art. Although gates 98, 112 comprise XOR gates in the illustrated embodiment, it should be understood by those in the art that other logic gate configurations are within the scope of the present invention. Gates 98, 112 receive current direction signals $V_{CDA}$, $V_{CDB}$, respectively, and directional control signals $V_{DIRA}$, $V_{DIRB}$ respectively, as inputs and control multivibrators 100, 114 responsive thereto.

Multivibrators 100, 114 are provided to control flip-flops 106, 120, respectively, and to thereby control the time at which current direction signals $V_{CDA}$, $V_{CDB}$, respectively, are provided to current control module 14 as directional control signals $V_{DIRA}$, $V_{DIRB}$, respectively. Multivibrators 100, 114 are conventional in the art and may comprise integrated circuits manufactured by Texas Instruments, Inc. of Dallas, Tex., Model No. SN74HC423. Multivibrators 100, 114 generate signals $V_{CLKA}$, $V_{CLXB}$ that attain a first logic level and remain at that logic level for a period corresponding to the calculated delay times $\Delta_A$, $\Delta_B$, respectively—as represented by delay signals $V_{DELAYA}$, $V_{DELAYB}$.

Flip flops 102, 116 are provided to generate directional control signals $V_{DIRA}$, $V_{DIRB}$, respectively, by gating current direction signals $V_{CDA}$, $V_{CDB}$, respectively, responsive to signals $V_{CLKA}$, $V_{CLKB}$ generated by multivibrators 100, 114.

In particular, flip flops 102, 116 output the value of current direction signals $V_{CDA}$, $V_{CDB}$, as directional control signals $V_{DIRA}$, $V_{DIRB}$, on each low to high logic transition of signals $V_{CLKA}$, $V_{CLKB}$. Directional control signals $V_{DIRA}$, $V_{DIRB}$ may be provided to current control module 14 for use in controlling the direction of current in the phase coils of motor 11. Flip flops 102, 116 are conventional in the art and may comprise conventional D flip flops manufactured by Texas Instruments, Inc. of Dallas, Tex., Model No. SN74HC74.

Capacitors 104, 106, 118, 120 are provided to ensure that the supply voltage applied to multivibrators 100, 114 and flip flops 102, 116, remains at a relatively constant voltage level. Capacitors 104, 106, 118, and 120 are conventional in the art.

Capacitors 108, 122 and resistors 110, 124 are provided to filter extraneous noise from current direction signals $V_{CDA}$, $V_{CDB}$, respectively. Capacitors 108, 122 and resistors 110, 124 are conventional in the art.

Figure 4A:
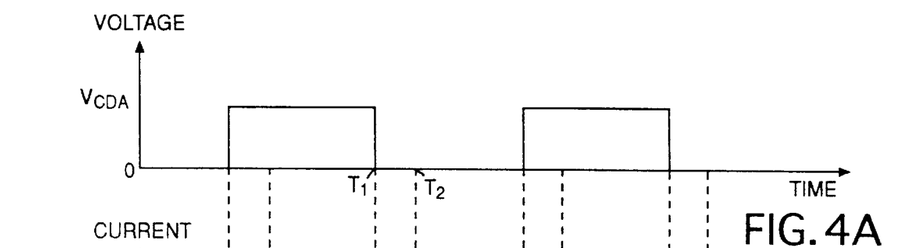
FIGS. 4A–4F are timing diagrams illustrating voltage and current levels for signals within the circuit of FIG. 3 when the actual rotor position is lagging the commanded rotor position.
Figures 4B, 4C:
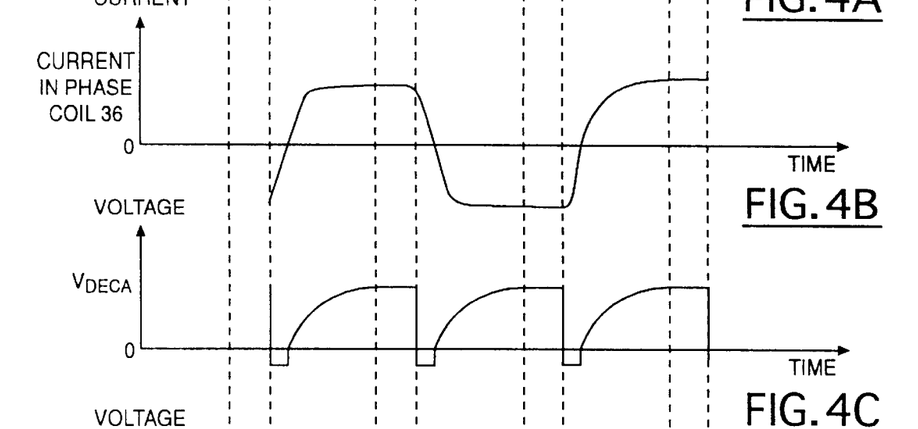

Referring to FIGS. 3 and 4A–F, a method for controlling a motor in accordance with the present invention will be described. A method for controlling motor 11 in accordance with the present invention may include the step of receiving decay time indicative signal $V_{DECA}$ indicative of the current decay time in phase coil 36. As discussed hereinabove with reference to FIG. 2, decay time indicative signal $V_{DECA}$ may be generated by amplifier 44 responsive to current indicative signal $V_{ISENSEA}$. Referring to FIGS. 4B and 4C, decay time indicative signal $V_{DECA}$ may assume a first polarity (negative in the illustrated embodiment) for a period of time after commutation of the current in phase coil 36. This period of time corresponds to the time required for the current to dissipate in phase coil 36 and is indicative of the inductance of phase coil 36, and therefore, the position of the rotor of motor 11.

Figure 4D:
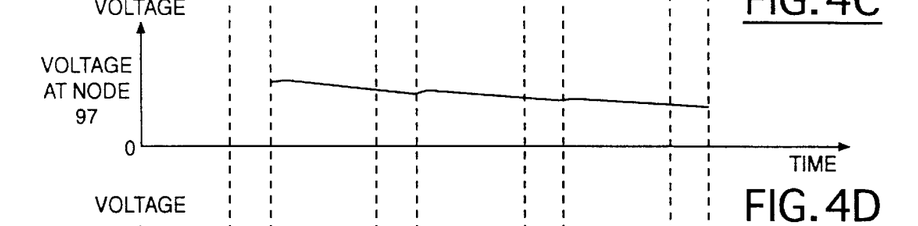

A method for controlling a motor in accordance with the present invention may also include the step of calculating a delay time $\Delta_A$, indicative of an amount of time decay time indicative signal $V_{DECA}$ has a first polarity (negative in the illustrated embodiment). This step may include the substep of charging a capacitor during the time that decay time indicative signal $V_{DECA}$ has the first polarity. As discussed hereinabove with reference to FIG. 3, delay time measurement circuit 56 may charge capacitors 84, 86, 88, 90, 92 by opening switch 68 whenever decay time indicative signal $V_{DECA}$ has a negative polarity. Referring to FIG. 4D, the voltage at node 97 will charge to a voltage level corresponding to the time during which decay time indicative signal $V_{DECA}$ has a negative polarity.

Figures 4E, 4F:
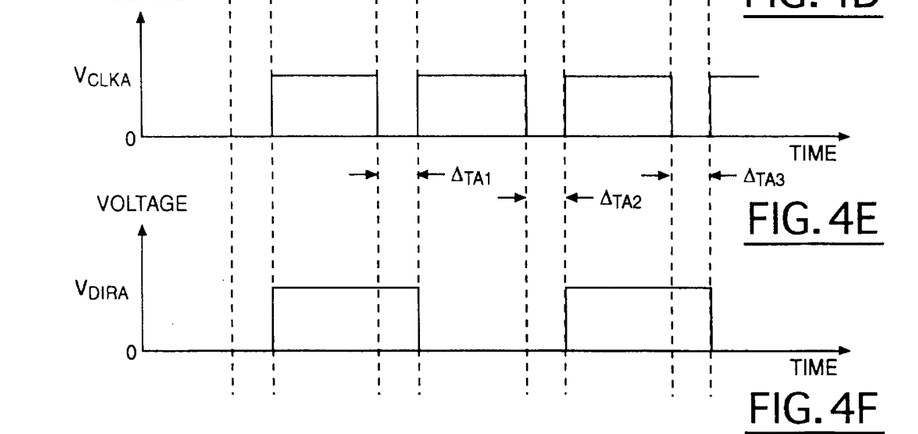
Figures 5A, 5B:
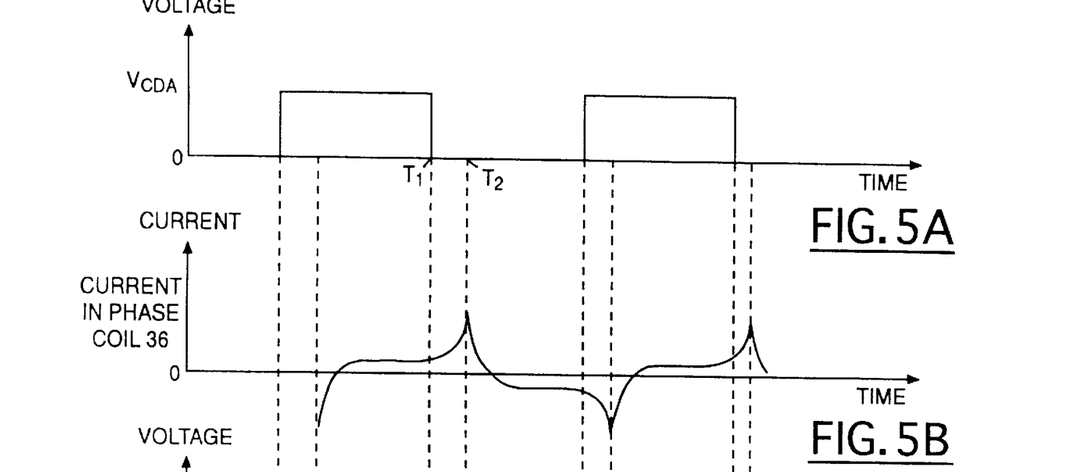
FIGS. 5A–5F are timing diagrams illustrating the voltage and current levels for signals within the circuit of FIG. 3 when the actual rotor position is leading the commanded rotor position.
Figures 5C, 5D, 5E:
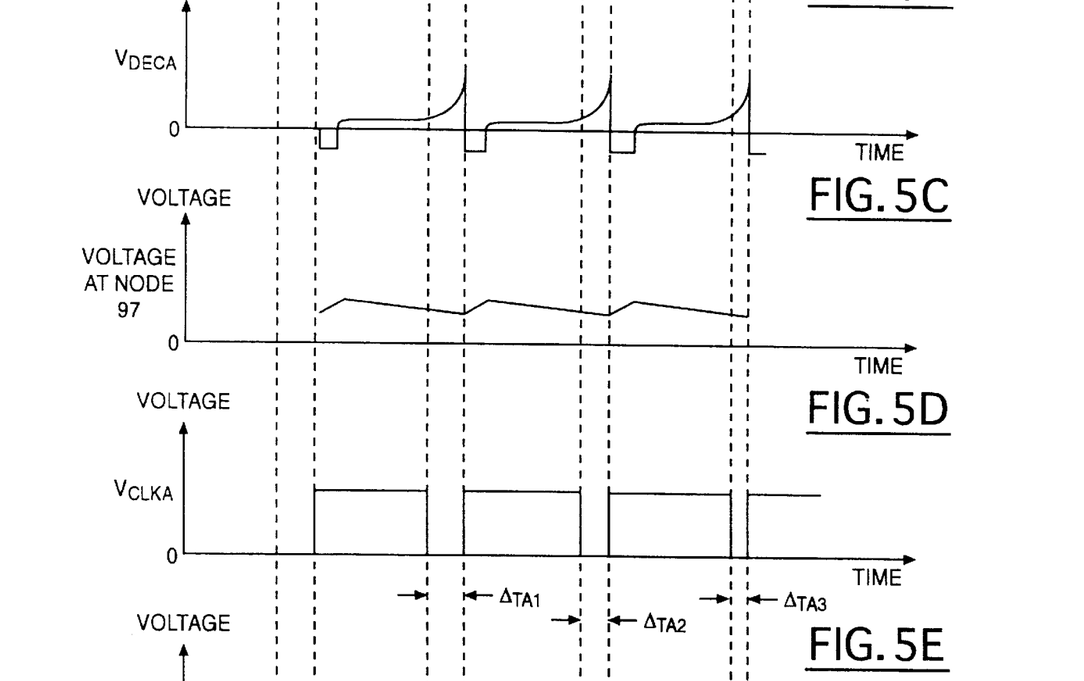
Figure 5F:
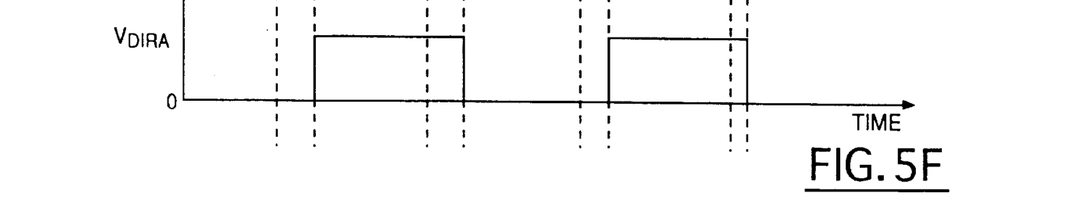

A method for controlling a motor in accordance with the present invention may further include the step of controlling a direction of current in phase coil 36 responsive to current direction signal $V_{CDA}$ and the calculated delay time $\Delta_A$. This step may include the substeps of: (i) generating a pulse corresponding to delay time $\Delta_A$ responsive to a transition of current direction signal $V_{CDA}$; and (ii) generating a directional control signal $V_{DIRA}$ responsive to the generated pulse and current direction signal $V_{CDA}$. As discussed hereinabove with reference to FIG. 3, multivibrator 100 may generate a signal $V_{CLKA}$ used to control flip flop 102. Referring now to FIGS. 4A and 4E, current direction signal $V_{CDA}$ may transition from a high logic level to a low logic level at time $T_1$. In response, the output of XOR gate 98 assumes a high logic level and triggers multivibrator 100. Referring to FIG. 4E, multivibrator 100 causes signal $V_{CLKA}$ to transition to a low logic level beginning a pulse. Multivibrator 100 also discharges the voltage on capacitor 94 to a predetermined lower voltage level. Signal $V_{CLKA}$ remains at a low logic level until the voltage on capacitor 94 charges up to a predetermined upper voltage level. The period of time $\Delta_{TA1}$ during which the voltage on capacitor 94 rises between the predetermined lower and upper voltage levels and signal $V_{CLKA}$ is at a low logic level is dictated by the voltage at node 97 of circuit 56. Because the voltage at node 97 represents delay time $\Delta_A$, the period $\Delta_{TA1}$ of the pulse generated by multivibrator 100 will correspond to delay time $\Delta_A$. As shown in FIGS. 4D and 4E, this relationship is inversely proportional (i.e., the greater the voltage level, or delay time $\Delta_A$, at node 97, the smaller the period $\Delta_{TA1}$ of the generated pulse). Referring now to FIGS. 4A, 4E and 4F, the termination of the pulse generated by multivibrator 100 (FIG. 4E) causes flip flop 102 to latch the value of current direction signal $V_{CDA}$ (FIG. 4A) through as directional control signal $V_{DIRA}$ (FIG. 4F). As seen in FIGS. 4A and 4F, therefore, the time at which current direction signal $V_{CDA}$ is provided to current control module 14 as directional control signal $V_{DIRA}$ is thereby adjusted to correct for mid-velocity instability in motor 11. In particular, when the position of the rotor in motor 11 lags the commanded rotor position (as it does in FIGS. 4A–4F), circuit 52 increases the delay before a change in current direction is initiated (with $\Delta_{TA1}$ less than $\Delta_{TA2}$, etc) to slow the stator field. Conversely, when the position of the rotor in motor 11 leads the commanded rotor position (as it does in FIGS. 5A–5F), circuit 52 reduces the delay before a change in current direction is initiated (with $\Delta_{TA1}$ greater than $\Delta_{TA2}$, etc) to quicken the stator field.

The above-described method was illustrated in FIGS. 4A–F for the condition in which the actual position of the rotor lags the commanded rotor position. It should be understood by those in the art, however, that the method may also be implemented to correct for the condition in which the actual position of the rotor leads the commanded rotor position as illustrated in FIGS. 5A–F.

The above-described method was also described with respect to the control of current within one motor phase coil 36 of motor 11 responsive to the decay time of current within that same phase coil 36. It should be understood from the foregoing description and from FIGS. 2 and 3, however, that the current in any phase coil of motor 11 may be controlled responsive to the measured current decay times in any of the phase coils of motor 11. Therefore, the current in other and/or additional phase coils within motor 11 may be controlled responsive to the decay time of current within coil 36 and the current in coil 36 may be controlled responsive to the decay time of current within other phase coils of motor 11. Thus, a method in accordance with the present invention may further include the step of controlling the direction of current within a second phase coil (phase B) of motor 11 responsive to a current direction signal $V_{CDB}$ for phase B and delay time $\Delta_A$. Alternatively, a method in accordance with the present invention may further include the steps of: (i) receiving a decay time indicative signal $V_{DECB}$ indicative of the current decay time in a second phase coil (phase B) of motor 11; (ii) calculating a delay time $\Delta_B$ corresponding to the time during which signal $V_{DECB}$ has a first polarity; and (iii) controlling the direction of current in the second phase coil responsive to current direction signal $V_{CDB}$ and delay time $\Delta_B$. Yet another alternative method embodiment may include the steps of: (i) receiving decay time indicative signals $V_{DECA}$, $V_{DECB}$, indicative of current decay times in two motor phases A and B of motor 11; (ii) calculating delay times $\Delta_A$, $\Delta_B$, corresponding to the time during which signals $V_{DECA}$, $V_{DECB}$, have a first polarity; (iii)controlling the direction of current in phase coil 36 (phase A) responsive to current direction signal $V_{CDA}$ and delay time $\Delta_B$; (iv) controlling the direction of current in phase B responsive to current direction signal $V_{CDB}$ and delay time $\Delta_A$.

A method and control circuit for controlling a motor in accordance with the present invention represent an improvement over known control circuits and methods. In particular, the inventive circuit and method reduce and/or eliminate mid-velocity instability in motor 11 even during a microstepping mode by controlling the timing of the current direction signals $V_{CDA}$, $V_{CDB}$ generated by translator 12 rather than the timing of the input signal to translator 12.

While the invention has been particularly shown and described with reference to the preferred embodiments thereof, it is well understood by those skilled in the art that various changes and modifications can be made in the invention without departing from the spirit and scope of the invention.

I claim:

1. A method for controlling a motor, comprising the steps of:
   receiving a first decay time indicative signal indicative of a first current decay time in a first phase coil of said motor;
   calculating a first delay time corresponding to an amount of time said first decay time indicative signal has a first polarity; and,
   controlling a direction of a first current in said first phase coil responsive to a first current direction signal and said first delay time.

2. The method of claim 1, further comprising the step of controlling a direction of a second current in a second phase coil of said motor responsive to a second current direction signal and said first delay time.

3. The method of claim 1, further comprising the steps of:
   receiving a second decay time indicative signal indicative of a second current decay time in a second phase coil of said motor;
   calculating a second delay time indicative of an amount of time said second decay time indicative signal has one of said first polarity and a second polarity; and,
   controlling a direction of said first current in said first phase coil responsive to said first current direction signal and said second delay time.

4. The method of claim 1 further comprising the steps of:
   receiving a second decay time indicative signal indicative of a second current decay time in a second phase coil of said motor;
   calculating a second delay time indicative of an amount of time said second decay time indicative signal has one of said first polarity and a second polarity; and,
   controlling a direction of a second current in said second phase coil responsive to a second current direction signal and said second delay time.

5. The method of claim 1 wherein said calculating step includes the substep of charging a capacitor while said first decay time indicative signal has said first polarity.

6. The method of claim 1 wherein said controlling step includes the substep of generating a pulse responsive to a transition of said first current direction signal, said pulse having a period corresponding to said first delay time.

7. The method of claim 6 wherein said controlling step further includes the substep of generating a directional control signal for controlling the direction of current in said first phase coil responsive to said pulse and said first current direction signal.

8. The method of claim 1 wherein said first current direction signal is generated by a translator.

9. The method of claim 1 wherein said first decay time indicative signal is generated by an amplifier responsive to a current indicative signal indicative of a level of said first current in said first phase coil.

10. A method for controlling a motor, comprising the steps of:
    receiving a first decay time indicative signal indicative of a first current decay time in a first phase coil of said motor;
    calculating a first delay time indicative of an amount of time said first decay time indicative signal has a first polarity; and,
    controlling a direction of a first current in a second phase coil responsive to a first current direction signal and said first delay time.

11. The method of claim 10 further comprising the steps of:
    receiving a second decay time indicative signal indicative of a second current decay time in said second phase coil of said motor;
    calculating a second delay time indicative of an amount of time said second decay time indicative signal has one of said first polarity and a second polarity; and,
    controlling a direction of a second current in said first phase coil responsive to a second current direction signal and said second delay time.

12. The method of claim 10 wherein said calculating step includes the substep of charging a capacitor while said first decay time indicative signal has said first polarity.

13. The method of claim 10 wherein said controlling step includes the substep of generating a pulse responsive to a transition of said first current direction signal, said pulse having a period corresponding to said first delay time.

14. The method of claim 13 wherein said controlling step further includes the substep of generating a directional control signal for controlling the direction of said first current in said second phase coil responsive to said pulse and said first current direction signal.

15. A control circuit for a motor, comprising:
    a sensor configured to sense the polarity of a first decay time indicative signal, said decay time indicative signal indicative of a first current decay time in a first phase coil of said motor;
    a delay time measurement circuit configured to calculate a first delay time corresponding to an amount of time in which said first decay time indicative signal has a first polarity; and,
    a first directional control circuit configured to control a direction of said first current in said first phase coil responsive to a first current direction signal and said first delay time.

16. The control circuit of claim 15 wherein said sensor comprises:
    a diode; and
    a resistor connected in series with said diode.

17. The control circuit of claim 15 wherein said delay time measurement circuit comprises:
    a capacitor that charges while said first decay time indicative signal has said first polarity.

18. The control circuit of claim 15 wherein said first directional control circuit comprises:
    a multivibrator that generates a pulse responsive to a transition of said first current direction signal, said pulse having a period corresponding to said first delay time; and, a flip flop that generates a directional control signal responsive to said pulse and said first current direction signal to control the direction of said first current in said first phase coil.

19. The control circuit of claim 15 further comprising a second directional control circuit configured to control the direction of a second current in a second phase coil responsive to a second current direction signal and said first delay time.

20. The control circuit of claim 15 further comprising:

a second directional control circuit configured to control the direction of a second current in a second phase coil responsive to a second current direction signal and a second delay time;

wherein said current sensor is further configured to sense the polarity of a second decay time indicative signal indicative of a current decay time in said second phase coil and said delay time measurement circuit is further configured to calculate a second delay time, said second delay time indicative of an amount of time in which said second decay time indicative signal has one of said first polarity and a second polarity.

* * * * *